United States Patent [19]
Brown

[11] Patent Number: 5,464,564
[45] Date of Patent: Nov. 7, 1995

[54] POWER SURGE RESISTOR PASTES CONTAINING TUNGSTEN DOPANT

[75] Inventor: Orville W. Brown, Lansdale, Pa.

[73] Assignee: National Starch and Chemical Investment Holding Corporation, Wilmington, Del.

[21] Appl. No.: 245,153

[22] Filed: May 17, 1994

Related U.S. Application Data

[62] Division of Ser. No. 88,452, Jul. 7, 1993, Pat. No. 5,345,212.

[51] Int. Cl.$^6$ ............... H01B 1/00; H01B 1/02; H01B 1/20; H01B 1/22
[52] U.S. Cl. ............ 252/514; 252/512; 106/1.19; 106/1.21
[58] Field of Search ............... 252/512, 514; 106/1.19, 1.21

[56] References Cited

U.S. PATENT DOCUMENTS

| | | | |
|---|---|---|---|
| 3,232,886 | 2/1966 | Hoffman | 252/514 |
| 3,639,274 | 2/1972 | Brandt et al. | 252/514 |
| 3,673,117 | 6/1972 | Schroeder et al. | 252/512 |
| 3,928,242 | 12/1975 | May | 252/512 |
| 4,051,074 | 9/1977 | Asada | 252/514 |
| 4,215,020 | 7/1980 | Wahlers et al. | 252/519 |
| 4,394,171 | 7/1983 | Nair | 106/1.14 |
| 4,415,486 | 11/1983 | Boonstra et al. | 252/514 |
| 4,452,726 | 6/1984 | Palanisamy et al. | 252/518 |
| 4,452,728 | 6/1984 | Carlson et al. | 252/518 |
| 4,452,729 | 6/1984 | Carlson et al. | 252/518 |
| 4,540,604 | 9/1985 | Siuta | 252/514 |
| 4,714,645 | 12/1987 | Kawasumi | 428/209 |
| 5,221,644 | 6/1993 | Berlin et al. | 501/19 |

OTHER PUBLICATIONS

C. Y. Kuo et al., *Thick Film Resistor Systems for Surge Protection*, Part I, ISHM 1990 Proceedings, pp. 431–437.
C. Y. Kuo et al., *Thick Film Resistor Systems for Surge Protection*, Part II, ISHM 1990 Proceedings, pp. 438–444.
C. Y. Kuo et al., *Thick Film Resistor Systems for Surge Protection*, Part III, ISHM 1991 Proceedings, pp. 457–462.

*Primary Examiner*—Paul Lieberman
*Assistant Examiner*—M. Kopec
*Attorney, Agent, or Firm*—Edwin M. Szala; Ellen T. Dec

[57] ABSTRACT

Power surge resistor pastes comprising palladium/silver, glass and dopant(s) are described for use in the manufacture of power surge resistor devices employed for power surge protection applications. The resultant surge resistors are characterized in their ability to dissipate repeated voltage surges equal in voltage and duration to surges created by lightning with less than 0.05% change in sheet resistance.

9 Claims, No Drawings

POWER SURGE RESISTOR PASTES CONTAINING TUNGSTEN DOPANT

This application is a Divisional of Ser. No. 08/088,452 filed Jul. 7, 1993 now U.S. Pat No. 5,345,212.

BACKGROUND OF THE INVENTION

1. FIELD OF THE INVENTION

This invention relates to improved electrically conductive compositions (pastes) employed in the manufacture of power surge resistor devices employed for power surge protection applications. The compositions are capable of being deposited by screen printing on alumina and similar ceramic substrates and the resultant surge resistors are characterized in their ability to dissipate repeated voltage surges equal in voltage and duration to surges created by lightning with less than 0.05% change in sheet resistance.

2. PRIOR ART

Voltage surge protective devices known in the art encompass a variety of materials, including, for example, epoxy/silicon, copper-nickel combinations, zinc oxide and zinc oxide with other oxide additives, forms and designs, and exhibit a variety of operating characteristics.

Power surge resistor devices of interest here are electrical devices manufactured with formulated resistor pastes or compositions based on palladium/silver powders or particles, glass and dopant(s). When a surge resistor device is wired into an electrical circuit, the electrical circuit is protected from damage by excess surges of line voltage such as may occur when the power line connected to a circuit is struck by lightning. Such devices are commonly wired into the electronic circuitry of television receivers, telephones, data processing equipment, computer elements and the like as a means for lightning strike and voltage surge protection.

Manufacturers of such protective devices are constantly searching for surge resistor pastes which will provide improved surge protection devices, particularly with respect to repeated voltage surges or lightning strikes. Informal standards set by industry and Underwriters Laboratories require the devices to withstand 20–200 multiple pulse surges at 2,500 volts and 1,000 volts, respectively, with less than 2% shift in sheet resistance.

Commercially available resistor pastes are also deficient in exhibiting temperature coefficient of resistance values (TCR) which are higher than desired by the device manufacturers. The relationship between the resistance change as a function of temperature is designated as the TCR of the protective device and defined as parts per million parts change per degree centigrade of temperature change, i.e., ppm/°C. Lower TCR values over a designated range of temperatures are now required for commercial acceptance as compared to TCR values of pastes sold 5–7 years ago.

The resistor pastes of this invention provide surge protection devices which have a sheet resistance of 0.1 to about 20 ohms per square and are capable of exceeding present industry standards in respect of multiple pulse surges as noted above and in meeting TCR values which are less than ±50 ppm/°C.

Resistor pastes based on palladium/silver combinations and glass have been known and used by practitioners for many years. See, for example, U.S. Pat. No. 3,639,274 issued Feb. 1, 1972 to Ivan L. Brandt et. al. The resistor pastes described in that patent are for the manufacture of ordinary resistors, not surge resistors. Screen printable conductor pastes based on palladium/silver and glass frit are described in U.S. Pat. No. 4,394,171 issued Jul. 19, 1983 to Kumaran M. Nair.

SUMMARY OF THE INVENTION

The surge resistor pastes of the present invention which are used to manufacture the power surge resistor devices of the invention are based on palladium/silver powder combinations, glass frit, dopants, and vehicle, i.e., organic solvent and binder. In particular, the invention is directed to commercially acceptable, screen printable pastes formulated with components used in the amounts within the noted ranges.

|  |  | Preferred |
|---|---|---|
| palladium | 38–60 parts | 46–52 parts |
| silver |  |  |
| glass frit | 6–20 parts | 10–14 parts |
| dopant(s) | 1–20 parts | 6–18 parts |
| solvent | 18–25 parts | 20–24 parts |
| binder | 2–6 parts | 2–4 parts | to total 100 parts by weight.

The pastes are particularly adapted for screen printing on a ceramic or otherwise conventional substrate and fired to burn off the solvent and binder(s) and fuse the solids to the substrate. The resistor pastes formulated within the above specification provide pastes which result in devices exhibiting improved resistance to multiple pulse surges and TCR values less than ±50 ppm/°C., and thereby exceed present industry guidelines and requirements.

DETAILED DESCRIPTION OF THE INVENTION

The palladium and silver metals are used in the form of fine amorphous powders. Preferably, the palladium powder will have a particle size equal to a surface area ranging from 12 to 29 meters$^2$/gram, and most preferably 19 to 25 meters$^2$/gram. The silver powder has a particle size equal to a surface area ranging from 0.2 to 4 meters$^2$/gram with a range of 0.7 to 1.2 meters$^2$/gram being most preferred. Metal powders having particle sizes outside of the noted ranges including metals in flake form may be used and will provide acceptable resistor pastes meeting less stringent requirements. The ratio of palladium to silver can vary from 56–62 parts by weight of palladium to 44–38 parts by weight of silver. However, a ratio of about 60 parts palladium to 40 parts of silver is preferred.

The glass frit included in the pastes herein are based on conventional glass components including, for example, BaO, $SiO_2$, CaO, $Na_2O$, $K_2O_3$, $Al_2O_3$, SnO, $B_2O_3$, $WO_2$ and $TiO_2$. Typically, the softening point of the glass should range from 700° C. to 1,000° C., and the coefficient of expansion of the glass should be compatible with the coefficient of expansion of the substrate upon which the paste will be screen printed. The following are representative glasses useful herein.

|  | Glass A wt. % | Glass B wt. % | Glass C wt. % | Glass D wt. % | Glass E wt. % |
|---|---|---|---|---|---|
| $Al_2O_3$ | 4.0 | 5.4 | 16.1 |  | 17.5 |

-continued

|  | Glass A wt. % | Glass B wt. % | Glass C wt. % | Glass D wt. % | Glass E wt. % |
|---|---|---|---|---|---|
| $B_2O_3$ | 17.8 | 12.4 | 5.0 | 17.4 | 6.8 |
| CaO | 36.0 |  |  | 18.2 |  |
| MgO | 3.5 |  |  | 5.6 |  |
| ZnO | 8.5 |  |  | 5.4 | 8.0 |
| $SiO_2$ | 30.2 | 49.3 | 26.7 | 17.5 | 40.5 |
| BaO |  | 27.4 | 50.2 |  |  |
| $BaCO_3$ |  |  |  |  | 26.3 |
| PbO |  |  |  | 33.5 |  |
| $Na_2O$ |  | 5.5 |  |  |  |
| CoO |  |  |  |  | 0.9 |
| $TiO_2$ |  |  | 2.0 |  |  |
| $ZrO_2$ |  |  |  | 2.4 |  |
| Softening pt. | 740° C. | 865° C. | 780° C. | 865° C. | 910° C. |

To obtain the improved performance characteristics in the resultant surge resistors, it is necessary that a tungsten dopant be included in the paste in an amount of at least 1 part and preferably 4 parts by weight of the paste formulation. Calcium is a desirable component and can be included either as a component of the glass formulation, a dopant, or both. Most improved performance results, particularly with respect to withstanding multiple pulsing, are obtained when tungsten and calcium dopants are included together with a calcium containing glass. Glasses formed with a minimum of 18 parts calcium oxide are preferred for use herein.

While tungsten is a necessary dopant and calcium is a desirable dopant herein, additional dopants may also be included in the paste formulation. Typical useful dopants include, but are not limited to, titanium, tantalum aluminum, barium, manganese, molybdenum, chromium, strontium, zinc and zirconium, all of which tend to have an effect on sheet resistance and can be included at the practitioner's discretion as required for particular applications. Ordinarily, these dopants will be used in the form of their oxides but they also may be used in the form of their temperature decomposable salts such as carbonates and oxylates. Tungsten may be used in its elemental, salt or oxide form. Typical amounts of tungsten (or tungsten oxide) and calcium oxide will range from 2–12 parts by weight of each in the paste formulation, but the combination of the two should not exceed about 15 parts. Dopants other than tungsten and calcium, when used, will be used in amounts of from about 0.5 to 5.0 parts by weight of the paste formulation. The particle size of the glass frit and dopants must be appropriate to provide a paste suitable for screen printing, preferably below about 6 microns. Pastes employing components within the disclosed formulation ranges comprising the disclosed representative glass frits can be prepared to provide surge devices having a sheet resistance of 0.1 to about 20 ohms per square and a TCR value less than ±50 ppm/°C.

Suitable binders include, for example, poly(vinyl acetate), poly(vinyl alcohol), methyl cellulose, ethyl cellulose, hydroxy ethyl cellulose and other binders known in the art. Ethyl cellulose is preferred for use herein. In forming the paste, the binder is preferably dissolved in an organic solvent at concentrations which comprise from about 10–20% by weight of the binder component. The pastes will in most instances require from about 2 to 4 parts binder by weight (dry).

Many suitable organic solvents known in the art can be used including, for example, acetone, xylene, ethanol, methanol, isopropanol, methyl ethyl ketone, and others. Terpenes such as pine oil, terpineol and the like are preferred and most preferred is terpineol. Aside from its use as a solvent for the binder component, the solvent functions to lower the viscosity of the paste to a suitable level for screen printing. More or less of the vehicle (solvent and binder) can be employed within the range noted above to provide suitably flowable pastes. Final paste viscosity will ordinarily be in the range of 100,000 to 400,000 cps measured on a Brookfield HBT viscometer using a #14 spindle at 10 rpm.

In forming the surge resistor paste, procedures known in the art can be used. The powdered metals, glass frit and dopant(s) are mixed with the vehicle and binder by mechanical mixing ordinarily employing a three-roll mill for a minimum of about five to ten minutes. The components form a screen printable paste composition which paste is printed typically with the help of a silk screen on a suitable substrate, most often, commercially available alumina. The surge resistor device will usually incorporate a serpentine pattern designed to provide a linear deposit of paste to maximize heat dissipation and length of the deposit within a given area. In commercial manufacture, the device substrate is preprinted and fired with a conductor composition at two points which will later be connected by the resistor paste screen-print pattern. The printed substrate is fired at a temperature of about 820 to 1000° C. for a sufficient period of time to volatilize or burn all the organic material and to sinter the glass and other organic materials. A firing time of about 0.5 to 1.5 hours is sufficient with exposure to peak temperatures for about 10–20 minutes.

Optionally, a dielectric glaze as is known in the art, ordinarily comprising a calcium-boron-silicate glass with $Al_2O_3$ filler, can be screen printed, fired and fused on a surge device to protect the functional surface against scratches, environmental corrosion and aid in heat dissipation.

TEST PROCEDURES

Multiple pulse surge testing of the resistor devices was carried out employing a CDI 1000 Universal Surge Generator manufactured by Compliance Design Inc., Boxborough, Mass. 01719. In the test procedure, the resistor device is subjected to repeat surges at 1000 V using a waveshape 2/10 μsec. Voltage surges are directed to the device until the device fails or 200 surges are completed. In similar manner the device is also subjected to repeated surges at 1000 V using a waveshape of 10/700 μsec until the device fails or 100 surges are completed. Lastly, the device is subjected to repeated surges at 2,500 V using a waveshape of 2/10 μsec for a maximum of 20 pulses or until the device fails. Sheet resistivity was noted before and after surging and expressed as % change in sheet resistivity.

TCR measurements were carried out employing a Delta 9023 Temperature Chamber manufactured by Delta Design, Inc., San Diego, Calif. 92123, together with a Hewlett-Packard Multimeter capable of measuring resistivity of the test device. In obtaining TCR values, the sheet resistance of the resistor device is first measured at room temperature (25° C.) and also measured at 125° C. and −55° C. TCR is defined as parts per million parts change in resistance change per degree centigrade of temperature change. The TCR is calculated separately for hot and cold temperature differentials from room temperature according to the formula (for hot TCR):

$$TCR = \frac{R_{125°\,C.} - R_{25°\,C.}}{R_{25°}} \Delta T \times 10^6$$

where $R_{RT}$=sheet resistivity in ohms at room temperature (25° C.). $R_{125°\,C.}$=sheet resistivity in ohms at 125° C.

The following examples are presented to illustrate this invention.

Example 1

A resistor paste composition within the scope of the invention was prepared employing the following formulation where the numbers designate parts by wt.

| | |
|---|---|
| Palladium | 34.48 |
| Silver | 25.52 |
| Glass frit (Glass A) | 11.00 |
| Tungsten powder | 3.00 |
| MnO$_2$ | 1.33 |
| CaO | 1.52 |
| TiO$_2$ | 0.90 |
| Vehicle (solvent + binder) | 22.25 |

The paste was formed by mixing the components and subjecting the paste to the mixing action of a three-roll mill for 10 minutes. The paste showed a fineness of grind of less than 5 microns and viscosity of 203,000 cps as run on a Brookfield HBT viscometer using a #14 spindle at 10 rpm.

The paste was screen-printed employing a 200 square serpentine pattern onto an alumina substrate with preprinted silver alloy electrodes to a fired thickness of about 12–14 microns. The printed pattern was oven-dried at a temperature of about 150° C. for 15 minutes. Firing was carried out employing a ventilated belt conveyor furnace and a peak temperature of about 850° C. for 8–10 minutes. The print was over-glazed with a thin layer (10–16μ) of calcium-borosilicate glass with Al$_2$O$_3$ filler.

Device characteristics:

Sheet resistivity ranged from 0.18–0.22 ohms/sq. (10 devices)

Sheet resistivity change on glazing +1.08%

Sheet resistivity change after multiple surging:

| | | |
|---|---|---|
| 2500 V (20 surges) (2/10 μsec) | 0.02% | |
| 1000 V (200 surges) (10/1000 μsec) | 0.012% | |
| 1000 V (100 surges) (10/700 μsec) | 0.033% | |
| TCR (hot) = −10 ppm/°C. | (25° to +125° C.) | |
| TCR (cold) = +28 ppm/°C. | (25° to −55° C.) | |

Example 2

Employing the procedure of Example 1, a resistor paste according to the invention was prepared with the following components (parts by wt.):

| | |
|---|---|
| Palladium | 24.0 |
| Silver | 16.0 |
| Glass frit (mixture of Glass A and B) | 19.0 |
| Tungsten powder | 12.0 |
| CaO | 2.0 |
| Al$_2$O$_3$ | 1.0 |
| TiO$_2$ | 4.0 |
| Vehicle (solvent + binder) | 24.0 |

Resistor devices (200 square pattern) made with this paste exhibited the following device characteristics:

Sheet resistivity approx. 14.4 ohms/sq. (average of 10 devices)

Sheet resistivity change on glazing +1.9%

Sheet resistivity change after multiple surging:

| | |
|---|---|
| 2500 V (20 surges) (2/10 μsec) | 0.008% |
| 1000 V (200 surges) (10/1000 μsec) | 0.03% |
| TCR (cold) +38 ppm/°C. | |
| TCR (hot) −29 ppm/°C. | |

Example 3

Employing the procedure of Example 1, a resistor paste according to the invention was prepared with the following components (parts by wt.):

| | |
|---|---|
| Palladium | 32.4 |
| Silver | 21.6 |
| Glass frit (Glass E) | 16.0 |
| Tungsten | 3.50 |
| MnO$_2$ | 1.34 |
| TiO$_2$ | 1.16 |
| CaO | 1.00 |
| Vehicle | 22.00 |

Resistor devices (200 square pattern) made with this paste exhibited the following device characteristics:

Sheet resistivity approx. 0.4 ohms/sq.

Sheet resistivity change after multiple surging:

| | |
|---|---|
| 2500 V (20 surges) (2/10 μsec) | 0.08% |
| 1000 V (200 surges) (10/1000 μsec) | 1.69% |
| 1000 V (100 surges) (10/700 μsec) | 0.975% |
| TCR (hot) −8 ppm/°C. | |
| TCR (cold) +41 ppm/°C. | |

Example 4

Employing the procedure of Example 1, a resistor paste according to the invention was prepared with the following components designated in parts by weight:

| | |
|---|---|
| Palladium | 32.4 |
| Silver | 21.6 |
| Glass frit (Glass C) | 17.0 |
| TiO$_2$ | 1.16 |
| MnO$_2$ | 1.34 |
| Tungsten | 5.50 |
| Vehicle | 22.00 |

Resistor devices (200 square pattern) made with this paste exhibited the following device characteristics:

Sheet resistivity approx. 0.2 ohms/sq.

Sheet resistivity change after multiple surging:

| | |
|---|---|
| 2500 V (20 surges) (2/10 μsec) | 0.07% |
| 1000 V (200 surges) (10/1000 μsec) | 0.68% |
| 1000 V (100 surges) (10/700 μsec) | −1.01% |
| TCR (hot) 48 ppm/°C. | |
| TCR (cold) 97 ppm/°C. | |

Example 5

Two pastes were prepared in this example employing nearly identical formulations. For comparison purposes one paste included no tungsten and the other included tungsten powder as a dopant in an amount of 3 parts by weight.

| | paste (parts by weight) | |
|---|---|---|
| | A | B |
| Palladium | 31.5 | 31.5 |
| Silver | 24.7 | 24.7 |
| Glass frit (Glass A) | 11.0 | 11.0 |
| MnO | 1.93 | 1.93 |
| $TiO_2$ | 0.90 | 0.90 |
| $Al_2O_3$ | 1.97 | 1.97 |
| Tungsten | 0.0 | 3.00 |
| Vehicle | 28.00 | 25.00 |

The resistor devices (200 square pattern) made with these pastes (and overglazed) exhibited the following device characteristics:

| | A | B |
|---|---|---|
| Sheet resistivity (ohms/sq.) | approx. 0.22 | 0.24 |
| Sheet resistivity change on glazing | 3.63% | 1.6% |
| Sheet resistivity change after multiple surging | | |
| 2500 V (20 surges) (2/10 μsec) | * | 0.053% |
| 1000 V (200 surges) (10/1000 μsec) | * | 0.072% |
| 1000 V (100 surges) (10/700 μsec) | * | not tested |
| * circuit failed on first surge | | |
| TCR (hot) ppm/°C. | 21 | 6 |
| TCR (cold) ppm/°C. | 98 | 58 |

The devices made with paste A, without tungsten, were unable to withstand multiple surges and showed poorer TCR values as compared to the devices made with paste B which included 3 parts by weight of tungsten dopant.

Example 6

Also for comparison purposes, resistor devices were prepared (200 square pattern) in usual manner with a commercially available resistor paste. The devices were overglazed with a thin layer (10–16μ) of calcium-boro-silicate glass with $Al_2O_3$ filler.

The resistor devices exhibited the following device characteristics.

Sheet resistivity approx. 0.280 ohms/sq.

Sheet resistivity change on glazing 10.72%

Sheet resistivity change after multiple surging

| | |
|---|---|
| 2500 V (20 surges) (2/10 μsec) | * |
| 1000 V (200 surges) (10/1000 μsec) | 0.36% ** |
| 1000 V (100 surges) (10/700 μsec) | 4.36% ** |
| * circuit failed on first surge | |
| ** average of 10 readings | |
| TCR (hot) | 46 ppm/°C. |
| TCR (cold) | 186 ppm/°C. |

The invention is not limited to the specific details and illustrative examples shown and described above. Many modifications and variations in practice will occur to those skilled in the art and such modifications and variations are intended to be encompassed by the scope of the following claims.

I claim:

1. A surge resistor paste composition suitable for screen printing onto a substrate comprising in combination (a) about 38–60 parts of palladium and silver, (b) 6–20 parts of glass frit, (c) 1–20 parts of dopant, (d) 2–6 parts of binder and 18–25 parts of vehicle, wherein the dopant component includes at least 1 part tungsten, to total 100 parts by weight of the paste.

2. The paste composition of claim 1 wherein the palladium and silver are employed as amorphous powders and the particle size of palladium is equal to a surface area ranging from 12 to 29 meters$^2$/gram and the particle size of silver is equal to a surface area ranging from 0.2 to 4 meters$^2$/gram.

3. The paste composition of claim 1 wherein the ratio of palladium to silver is from 56–62 parts by weight of palladium to 44–38 parts by weight of silver.

4. The paste composition of claim 1 wherein the glass frit is a calcium-containing glass frit.

5. The paste composition of claim 1 wherein the dopant component includes calcium.

6. The paste composition of claim 4 wherein the dopant component includes calcium.

7. The paste composition of claim 1 wherein the glass frit has a softening point ranging from 700°–1,000° C.

8. The paste composition of claim 1 wherein the tungsten is in elemental, salt or oxide form.

9. The paste composition of claim 4, said paste capable of providing a surge resistor device of from 0.1 to 20 ohms/square, and characterized by withstanding at least 20 multiple pulse surges at 2,500 V and at least 200 multiple pulse surges at 1000 V with less than 2% shift in sheet resistance, and exhibiting a TCR less than ±50 ppm/°C.

* * * * *